United States Patent [19]

Tejeda

[11] Patent Number: 4,745,897

[45] Date of Patent: May 24, 1988

[54] AUTOMATIC ELECTRONIC AND MECHANICAL SYSTEM TO AVOID VEHICLE THEFT

[76] Inventor: José O. V. Tejeda, Juan de la Barrera 33, Circ. Heroes, Cd. Satelite, C.P. 53100, Edo. de Mexico, Mexico

[21] Appl. No.: 945,003

[22] Filed: Dec. 22, 1986

[51] Int. Cl.⁴ .............................................. B60R 25/04
[52] U.S. Cl. ................................ 123/198 B; 180/287; 180/289; 307/10 AT; 340/63
[58] Field of Search ..................... 123/198 B; 180/287, 180/289; 307/10 AT; 340/63

[56] References Cited

U.S. PATENT DOCUMENTS 3,781,789 12/1973 Caleskie et al. ...................... 180/289
4,133,410 1/1979 Krusoe ............................. 123/198 B

*Primary Examiner*—Allen M. Ostrager
*Attorney, Agent, or Firm*—Roberts & Floyd

[57] ABSTRACT

A system to avoid theft of vehicles equipped with internal combustion engines by automatically blocking the fuel flow. This automatic blocking exists every time the engine is turned off or optionally, when any vehicle door is opened while the engine is running.

1 Claim, 2 Drawing Sheets

AUTOMATIC ELECTRONIC AND MECHANICAL SYSTEM TO AVOID VEHICLE THEFT

CROSS-REFERENCE TO RELATED APPLICATION

This invention is not disclosed in any co-pending application for a patent or any issued patent.

BACKGROUND OF THE INVENTION

The vehicle anti-theft devices most widely used are of the following three types: First, physical blocking, such as a steel rod with a lock fastened from brake pedal to steering wheel; second, electrical blocking to the ignition; and third, alarms.

These systems exhibit to greater or lesser extent the disadvantages that most are easily detectable and disconnectable, and most are not automatic.

One prior art system shuts off the fuel line, as well as having an ignition cutoff. This is the Model K 400 FS of Automotive Security Products. It is activated by a visible keypad, containing an owner code. A thief is immediately informed of the protection system by the keypad, and may simply substitute his keypad, with his code to operate the vehicle.

SUMMARY OF THE INVENTION

A system to avoid theft of vehicles equipped with internal combustion engines by automatically blocking the fuel flow. This automatic blocking exists every time the engine is turned off or optionally, when any vehicle door is opened while the engine is running.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

The invention will be better understood and the objects other than those set forth above will become apparent when consideration is given to the following detailed description thereof. Such description makes reference to the annexed drawings wherein.

DESCRIPTION OF THE PREFERRED EMBODIMENTS

Figure 1:
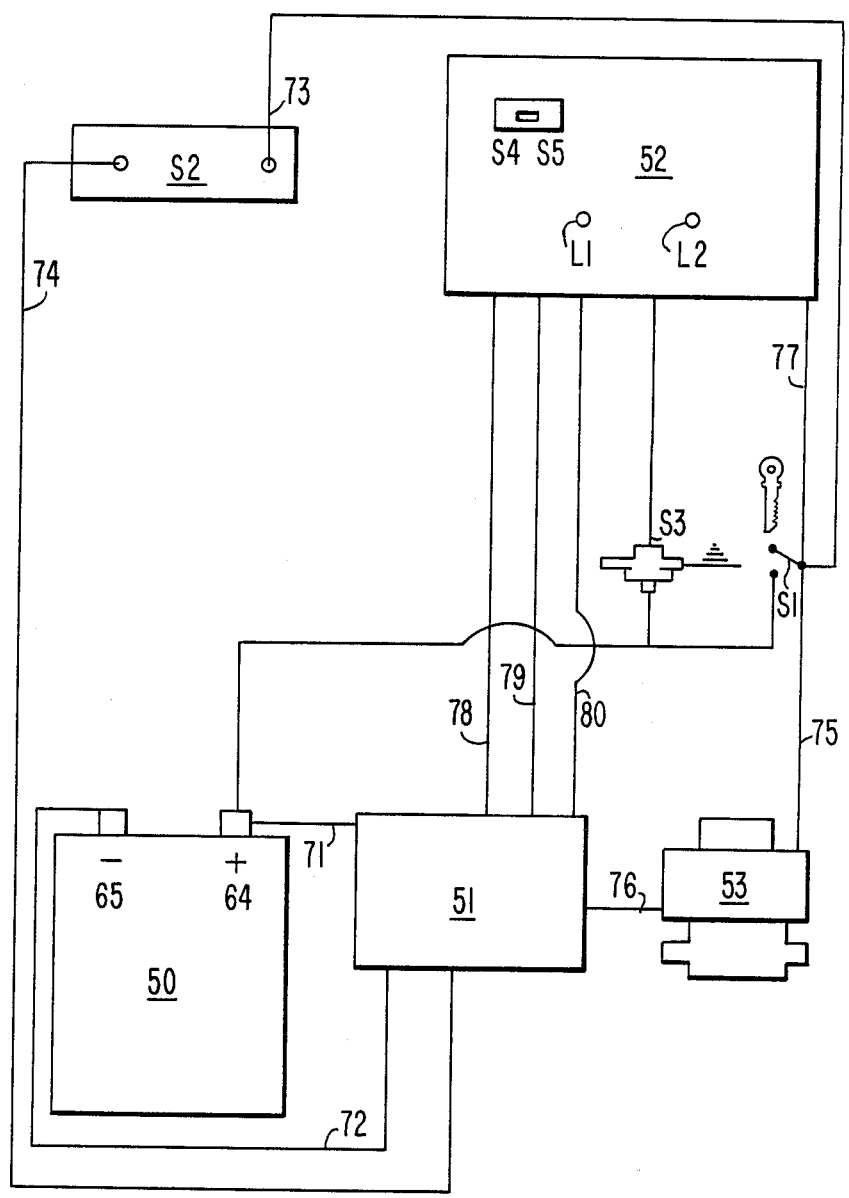
FIG. 1 is a diagrammatic view of the invention.

The automatic vehicle anti-theft system which comprises the present invention is described herein with respect to one embodiment. That embodiment is an attachment to an automotive vehicle having a conventional wiring harness for a battery 50 including a key operated ignition switch S 1 furnishing switched electrical current to the ignition, radio, vent, etc.

The present invention includes a electrical module 51 connected by electrical cable 71 to the positive terminal 64 of the battery 50 and by electrical cable 72 to the negative terminal 65 of the battery 50. The positive terminal 64 of the battery 50 is also connected to key operated ignition switch S 1 supplying switched electrical current to the electrically controlled fuel supply system 53, the momentary switch S 2 and the mode switch box 52.

The momentary switch S 2 is connected by electrical cable 73 to ignition switch S 1 and by electrical cable 74 to electrical module 51. The momentary switch S 2 should be either hidden, such as underneath the dash, or undetectable. It may be any convenient switch, including a magnetic switch, operated by a hand held magnet, a foil or tape switch, operated by finger pressure, or an aperture switch, operated by inserting a pencil point or sharp object into the aperture switch.

The electrically controlled fuel supply system 53 is connected by electrical cable 75 to ignition switch S 1 and by electrical cable 76 to electrical module 51. The electrically controlled fuel supply system 53 may be a solenoid controlled fuel valve inserted into the fuel line, may be the motor of a electric fuel pump or may be relay for another fuel control device. In any case, only when electrical current flows through the device, does fuel flow to the engine.

Within the electrical module 51 is a SCR Transistor T3 which is an electronic valve which controls flow of electric current from electrically controlled fuel supply system 53, through electrical cable 72, to the negative terminal 65 of the battery 50. The momentary switch S 2 is connected to the gate of SCR Transistor T3, through resistors R6, R5, and R1, within electrical module 51.

Also within the electrical module 51 is a NPN transistor T1 whose emitter is connected to SCR transistor T3 and whose collector is connected, through electrical cable 72, to the negative terminal 65 of battery 50. The base of NPN transistor T1 is connected through bias resistor R4 to the emitter, through resistor R7 and resistor R11, to electrical cable 77 and the switched electrical current. The base of NPN Transistor T1 is also connected, through resistor R7, to the open door switch S 3.

The valet parking override switch S 5, resistor R9, and resistor R10, of the mode switch box 52 are all connected by electrical cable 80 through electrical module 51, and electrical cable 71 to the positive terminal 64 of the battery 50. The electrically controlled fuel supply system 53 and the light emitting diode L2 are connected to the SCR transistor T3 of the electrical module 51 through electrical cable 79.

Within the mode switch box 52 is a first light emitting diode L1 connected through resistor R9 to electrical cable 78 through the electrical module 51 and electrical cable 71 to positive terminal 64 of battery 50. The light emitting diode L1 is also connected through electrical cable 78 to electrical module 51 to the anode of SCR transistor T2, and is a red pilot light. Also within the mode switch box 52 is light emitting diode L2 connected through resistor R8 to electrical cable 77 and the switched electrical current of ignition switch S 1. The light emitting diode L2 is also connected to the anode of SCR Transistor T3, and is a green pilot light.

Figure 2:
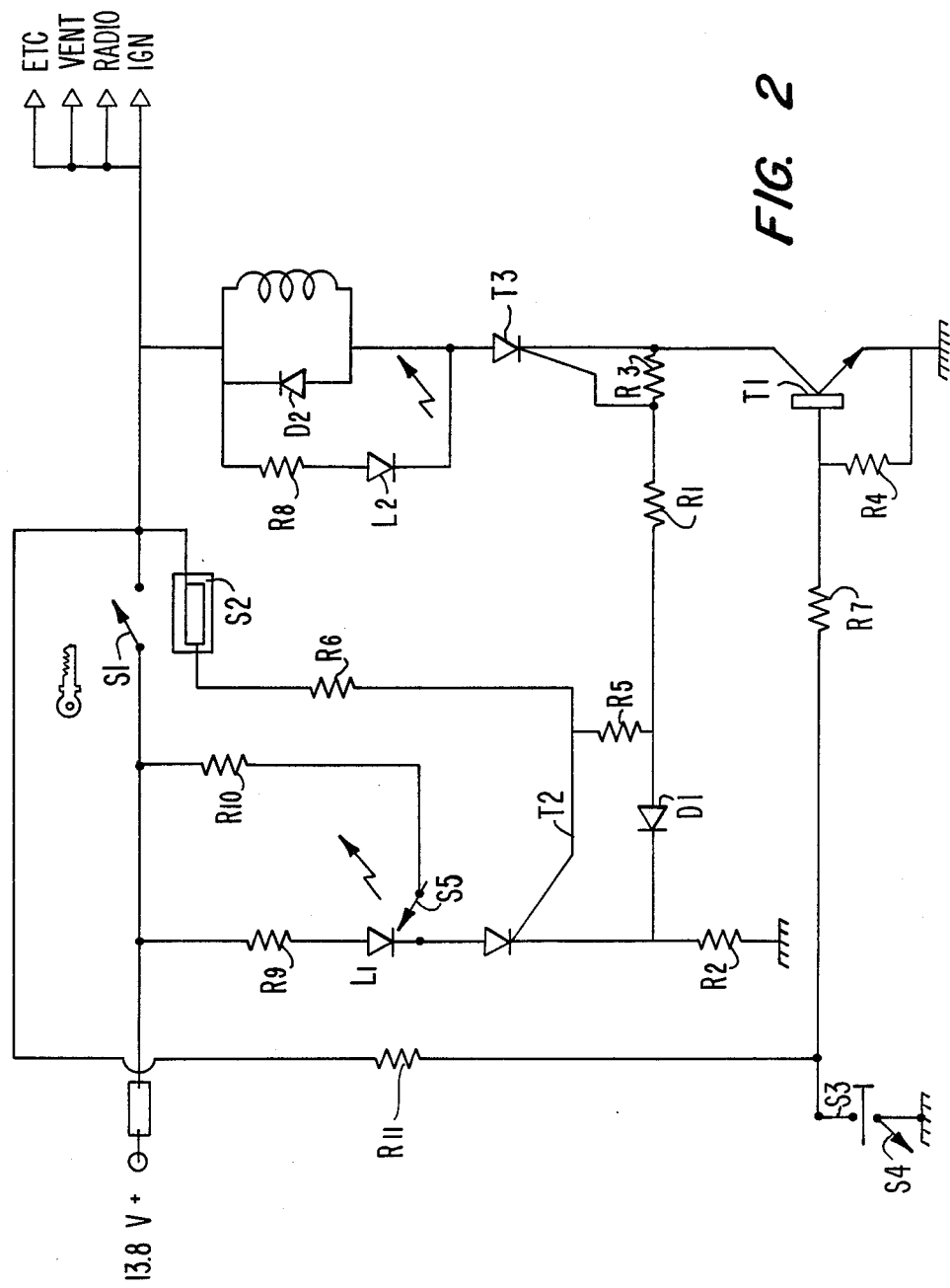
FIG. 2 is a schematic view of the invention.

Refering to FIG. 2, the values of the components may be the following:

R1=150 ohm
R2=360 ohm
R3=1 k ohm
R4=2200 ohm
R5=390 ohm
R6=220 ohm
R7=2200 ohm
R8=560 ohm R9=150 ohm
R10=100 ohm
R11=680 ohm
D1=D2=1N4006
T1=T1P41C
T2=T3=S2800 or C122

The present invention operates in any one of three modes. The first two modes are protection modes and the third mode is an unprotected mode.

The first, or normal, mode is a combination anti-theft mode and anti-hijack mode. The open door override switch S 4 is closed, enabling the open door switch S 3. The valet parking override switch S 5 is open, disabling the valet mode. The owner closes the ignition switch S 1 and presses the momentary switch S 2. This applies a current to the gate of SCR Transistor T3, opening the current through the solenoid controlled fuel valve. After the SCR Transistor T3 is turned on, it remains on, until the ignition switch S 1 is opened by turning off the key.

If a thief turns on the ignition switch S 1, but fails to press the momentary switch S 2, the motor will start. However, the electrically controlled fuel supply system 53 remains closed and the motor will stop in several seconds for lack of fuel. The switched electrical current will be supplied to the electrically controlled fuel supply system 53, but the SCR Transistor T3 will not pass the current. Thus the thief who has a key will be able to start the vehicle and run a short distance. The motor will then stop. The ignition and starter will work, but the vehicle will give the appearance of an engine malfunction and the thief will have to abandon it to avoid apprehension.

In the first, or normal mode, the owner and vehicle are also protected against hijacking by the anti-hijack mode. This mode operates automatically by anyone opening a door during operation. If a hijacker forces the owner to open the door, the owner may leave the vehicle. The hijacker may get into the vehicle and drive away. However, in several seconds the motor will stop and the hijacker will not be able to restart the motor.

In the anti-hijack mode, when a door opens, the open door switch S 3 is closed. This lowers the voltage on the gate of NPN transistor T1. This in turn blocks current to flow through NPN transistor T1 which raises the voltage on the cathode of SCP transistor T3 which causes SCR transistor T3 to close. This turns off the electrically controlled fuel supply system 53, causing the motor to stop. The motor can be restarted only by closing the door, thus opening the open door switch S 3, and then by closing momentary switch S 2. Neither the location, nor the function of momentary switch S 2 will be apparent to a hijacker.

It will often be convenient to disable the anti-hijack mode to allow the owner to pick up or let off passengers. The vehicle may be operated in the second of the two protection modes by opening the open door override switch S 4. This disables the open door switch S 3 and leaves the NPN Transistor T1 open, so that NPN Transistor T1 cannot turn off SCR Transistor T3 and close the electrically controlled fuel supply system 53.

The third mode is the valet mode or unprotected mode. The owner turns valet parking override switch S 5 on. This supplies current continuously to the gate of SCR Transistor T3, effectively grounding the electrically controlled fuel supply system 53. The electrically controlled fuel supply system 53 thus operates whenever the ignition switch S 1 is closed, and there is no evidence that the vehicle is protected by an automatic vehicle anti-theft system.

The light emitting diode L2, which may be a green pilot light, is on whenever the electrically controlled fuel supply system 53 is open, supplying fuel to the engine. The light emitting diode L1, which may be a red pilot light, is on whenever the valet parking override switch S 5 is closed and the automatic vehicle anti-theft system is in the valet mode or unprotected mode.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An automatic vehicle anti-theft system having an anti-theft mode and an anti-hijack mode, for a vehicle having both an ignition switch S 1 and an open door switch S 3 for a door, comprising in combination;
   (a) an electrically controlled fuel supply system 53 supplied with switched electrical current by said ignition switch S 1;
   (b) a momentary switch S 2 supplied with switched electrical current by said ignition switch S 1;
   (c) an electronic valve between said electrically controlled fuel supply system 53 and the ground;
   (d) said electronic valve normally closed and opened by a voltage applied to its gate and remaining open thereafter;
   (e) said momentary switch S 2 supplying a voltage to the gate of said electronic valve to open said electronic valve whenever said ignition switch is on;
   (f) said electronic valve operating said electrically controlled fuel supply system 53 when said ignition switch S 1 is closed and then said momentary switch S 2 is thereafter closed;
   (g) said open door switch S 3 open when the door is closed and closed when said door is open;
   (h) said open door switch S 3 controlling said electronic valve to close said electronic valve when said open door switch S 3 is closed;
   (i) an open door override switch S 4 to selectively disable said open door switch S 3 and to disable said anti-hijack mode; and,
   (j) a valet parking override switch S 5 to selectively disable the anti-theft mode while the vehicles in the valet mode;

whereby said automatic vehicle anti-theft system permits the owner of said vehicle to disable either of two protection modes.

* * * * *